J. M. IZQUIERDO.
FILTERING APPARATUS.
APPLICATION FILED DEC. 10, 1918.
1,337,517.
Patented Apr. 20, 1920.
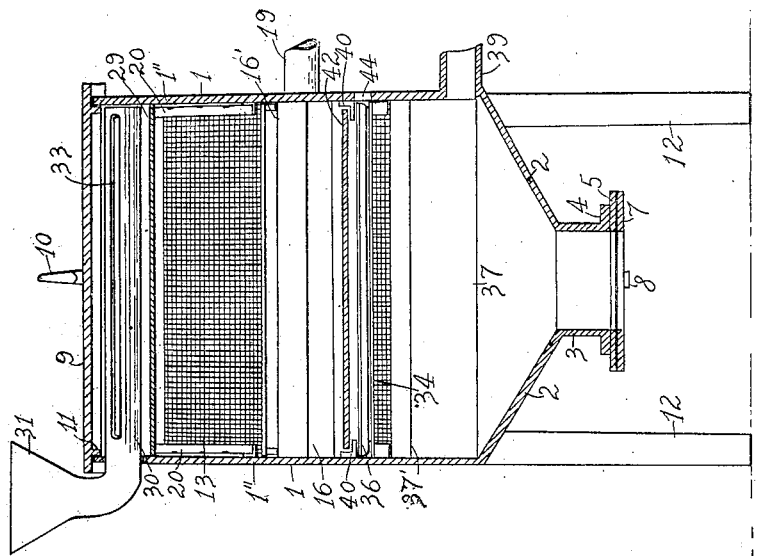
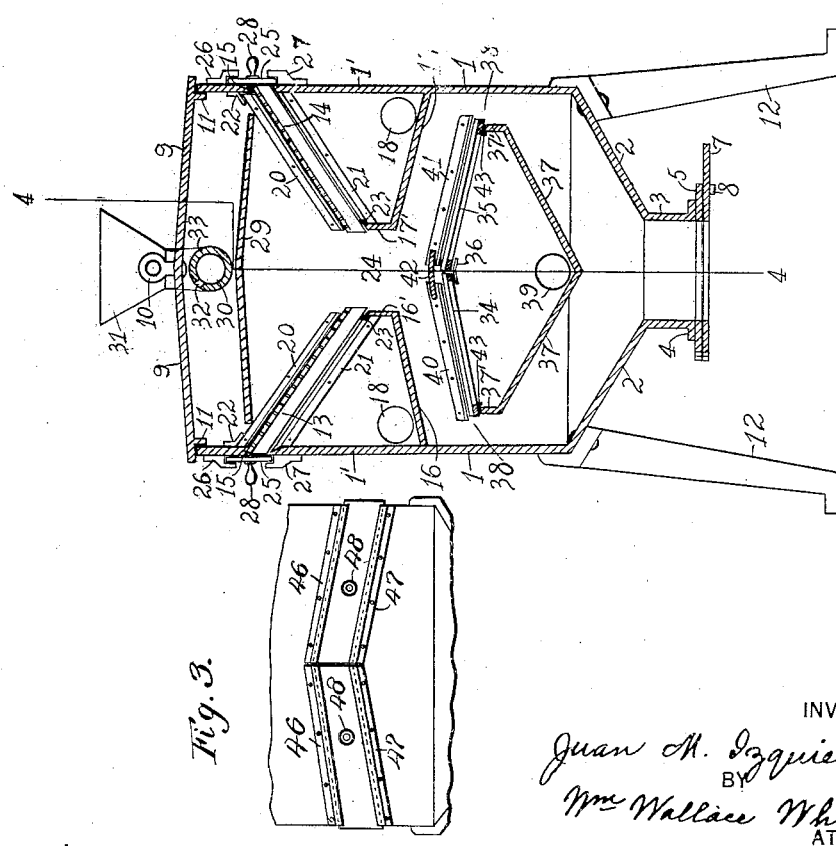
INVENTOR
Juan M. Izquierdo
BY
Wm Wallace White
ATTORNEY

UNITED STATES PATENT OFFICE.

JUAN M. IZQUIERDO, OF HABANA, CUBA.

FILTERING APPARATUS.

1,337,517.  Specification of Letters Patent.  Patented Apr. 20, 1920.

Application filed December 10, 1918. Serial No. 266,054.

*To all whom it may concern:*

Be it known that I, JUAN M. IZQUIERDO, citizen of the Republic of Cuba, residing at Habana, Republic of Cuba, have invented new and useful Improvements in Filtering Apparatus, of which the following is a specification.

This invention relates to the filtration of liquids for their purification, especially to the cane liquor or defecated juices of the sugar cane, and its object is to provide a filtering apparatus of new construction that embodies the principle of fractional filtration, or in other words, an apparatus in which the residue of the first filtration is submitted to a new filtration and is essentially composed of a series of inclined filtering surfaces arranged one over the other in such a way that the residue of the filtration in the upper filtering surface falls on the filtering surface next below, which presents the advantage of obtaining a continuous and repeated filtration using the action of gravity upon the same liquid to be filtered. This invention also comprises arrangements by which means the filtering surfaces can be cleaned and substituted in the easiest way.

The invention is described with reference to the figures of the annexed drawing, in which—

Figure 1 is a vertical section of the apparatus.

Fig. 2 is a vertical section on line 4—4 of Fig. 1.

And Fig. 3 is a detail view of the hatches for closing the openings through which the filtering frames are introduced into the box.

This filtering apparatus is composed of a metallic box 1 of square or rectangular horizontal section with its bottom 2 in the form of a funnel terminating in a vertical discharge pipe 3 provided at its lower end with a horizontal flange 4 under which is fixed an annular plate 5 on which is pivotally mounted by means of screws 6, a gyratory hatch 7 sustained in its closed position by means of a staple 8. The top of box 1 is closed by means of a removable cover 9 formed of two inclined halves and provided with a hanger 10 in its center presenting a lower vertical flange 11 by means of which it is fitted to the box 1. The box is supported on the floor or a convenient base by means of four inclined feet 12 conveniently fastened to the box 1.

Inside the upper half of the box 1 are arranged two filtering surfaces laterally inclined downward from the lateral walls 1' of the box to the center thereof. These surfaces are formed by two frames of wire gauze 13 and 14 which are introduced through openings 15 in the lateral walls of the box 1 and rest conveniently upon cavities or receptacles 16 and 17 formed close to the lateral walls and which present their bottom walls slightly inclined outwardly. The front wall of the box 1 is formed with openings 18 from each one of which leads an exterior pipe 19 to conduct the filtered liquid through each filtering surface 13 or 14 and with the object to prevent the liquid to be filtered from falling by the borders of the filtering frames 13 and 14. The front and back walls 1″ of the box 1, are provided with inclined angular plates 20 fixed to walls 1″ of the box above the filtering frames 13 and 14 and inclined angular plates 21 are fixed to the same walls 1″ under said filtering frames 13 and 14. Angular plates 22 are fixed to the lateral walls 1″ of the box above the openings 15. The plates 21 also serve to support the removable filtering frames 13 and 14 in their inclined position in which they are held by gyratory projections 23 pivoted on the inner side of the walls 16' and 17' of the frames 13 and 14. Between the filtering frames 13 and 14 there is a hollow space 24 for the passing of the liquid that falls from both filtering surfaces without being filtered. The openings 15 of the lateral walls 1' of the box 1 are closed by means of hatches 25 running on upper and lower flange guides 26 and 27 fixed exteriorly on the walls 1'. The hatches 25 are provided with handles 28, as shown.

Upon the filtering frames 13 and 14 and between the front and back walls 1″ of the box 1 is a partition 29 which is inclined downwardly from its center, as shown. Above the center of the partition 29 is a horizontal supply pipe 30 which passes through an opening in the wall 1″ and is then bent upwardly and terminates in a funnel 31 by means of which the liquid to be filtered is introduced into the pipe. That portion of the pipe which is disposed inside the box 1 is formed with two longitudinally extending slots 32 and 33 by means of which the liquid is distributed over the two inclined portions of the partitions 29.

Under the receptacles 16 and 17 and in spaced relation thereto are disposed another two inclined filtering surfaces which are inclined in a direction opposite to the upper lateral filtering surfaces 13 and 14. These surfaces consist of two frames of wire gauze 34 and 35 mounted upon an angular plate support 36 that runs between the front and back walls 1″ of the box precisely under the center of the hollow space 24 between the upper lateral receptacles 16 and 17. The said frames 34 and 35 are supported by their outer edges upon the exterior borders of the vertical walls 37′ of a box 37 in the form of a funnel fixed between the front and back walls 1″ of the box 1, said walls 37′ being spaced a certain distance from the lateral walls 1′ of the box 1 to form hollow spaces 38 for the downfall of the residue of the filtration on the filtering frames 34 and 35. The exterior box 37 is provided with a discharge pipe 39 near the lowest part of its bottom for the discharge of the filtered liquid through the filtering frames 34 and 35, with the idea of preventing the liquid that falls on the filtering frames from passing between the same and the front and back walls 1″ of the box 1. Between the same filtering frames there are inclined angular plates 40 and 41 fixed to the walls of the filtering frames 34 and 35. A convex plate 42 spans the space between said angular plates 40 and 41. Said filtering frames 34 and 35 are retained in position by means of interior gyratory projections 43 pivoted on the inner side of said frames and retained by the upper borders of the wall 37′ of the box 37. Said filtering frames are removable, they being introduced inside the box 1 through openings 44 formed in the front wall 1″ of the box 1 and which are closed by hatches 45 running in flange guides 46 and 47 fixed exteriorly on the wall 1″ and provided with handles 48.

The operation of the apparatus is as follows: The liquid to be filtered is introduced into the pipe 30 through the funnel 31, whereupon it leaves the pipe through the slots 32 and 33 and falls upon the inclined portions of the partition 29. Owing to the inclination of the partition 29, the liquid is directed on the upper filtering surfaces 13 and 14. The major portion of the liquid percolates through the filtering surfaces 13 and 14 and is deposited in the receptacles 16 and 17. From the receptacles the liquid is discharged through the pipes 19, as will be understood. That portion of the liquid which does not pass through the surfaces 13 and 14 falls through the central bottom space 24 and then on to the surfaces 34 and 35. The liquid is now filtered by the surfaces and is discharged into the receptacle 37 and because of the inclination of the bottom wall of this receptacle, the liquid is directed to the discharge pipe 39. Any other liquid which does not pass into the receptacle 37 falls through the spaces 38 and is gathered in the bottom tube where it may be discharged by opening the hatch 7.

When it is desired to clean the filtering surfaces 13 and 14, it is only necessary to move the hatch 25 so as to uncover the opening, whereby a brush may be inserted into a box and the wire gauze thoroughly cleaned. The frames are readily withdrawn through the openings 44 so that they may be removed, cleaned and replaced.

It is evident that any number of inclined filtering surfaces may be employed and various modifications may be made without departing from the spirit of the invention, and the spirit and scope of the appended claims.

What I claim is:

1. A filtering apparatus, comprising a plurality of pairs of filtering surfaces disposed one above another, the members of each pair being inclined in opposite directions relatively to each other and to the members of the pair immediately therebelow, the members of one pair being spaced apart and the members of the next succeeding pair connected together below said space.

2. A filtering apparatus, comprising a pair of filtering surfaces downwardly converging and spaced apart, means for discharging a liquid to be filtered over said surfaces, a pair of downwardly diverging filtering surfaces connected together beneath the space that separates the first filtering surfaces, and means for separately receiving the portions of filtered liquid from the two pairs of filtering surfaces.

3. A filtering apparatus comprising a box, a pair of lateral filtering surfaces downwardly converging and spaced apart inside the box, means for dividing into two parts the liquid to be filtered over said filtering surfaces, receptacles separately formed inside the box under said filtering surfaces, a pair of filtering surfaces downwardly diverging and connected together beneath the space that separates the first filtering surfaces and separated from the lateral walls of the box, a receptacle formed inside of the box and under the second filtering surfaces, and a discharge opening in the bottom of the box for the last residue of the filtrations.

4. A filtering apparatus comprising a box, a pair of lateral filtering surfaces downwardly converging and spaced apart inside of the box, and adapted to pass through openings in the lateral walls of the box and removably supported therein, closing hatches for said openings, receptacles separately formed near the lateral walls of the box under said filtering surfaces, pipes for the discharge of the filtered liquid communicating with said receptacles, another pair of filtering surfaces inclined divergently and connected together beneath the space that separates the first filtering surfaces and separated from the lateral walls of the box, the second filtering surfaces being adapted to pass through openings in the front and back walls of the box and removably supported therein, closing hatches for the openings, a receptacle formed inside the box under the second filtering surfaces, a pipe for the discharge of filtered liquid communicating with said second receptacle, and a discharge opening in the bottom of the box for the residue of both filtrations.

5. A filtering apparatus comprising a box, a pair of lateral filtering surfaces downwardly converging and spaced apart inside the box, and adapted to pass through openings in the lateral walls of the box and removably supported therein, closing hatches for said openings, angular plates fixed to the walls of the box above the connections between said walls and the filtering surfaces, receptacles separately formed near the lateral walls of the box under said filtering surfaces, pipes for the discharge of the filtered liquid communicating with said receptacles, a partition inclined in opposite directions from its center line fixed inside the box above the said filtering surfaces and with its borders separated from the lateral walls of the box, a supply pipe above the center line of said partition and provided with two upper lateral grooves for the discharge of the liquid, a pair of filtering surfaces inclined divergently and connected together beneath the space that separates the first filtering surfaces and separated from the lateral walls of the box, said second filtering surfaces being adapted to pass through openings in the front and back wall of the box and removably supported therein, closing hatches for the openings, plates fixed to the walls of the box above the connections between said walls and the second filtering surfaces, a receptacle formed inside of the box under the second filtering surfaces, a pipe communicating with the second receptacle for the discharge of the liquid filtered, a cover for the box, and a discharge opening in the bottom of the box for the final residue of the filtrations effected in the same.

In testimony whereof I have signed my name to this specification.

JUAN M. IZQUIERDO.